Feb. 20, 1934.    M. BÜDSCHEID    1,948,439
ELECTRIC POWER CABLE
Filed Nov. 1, 1926
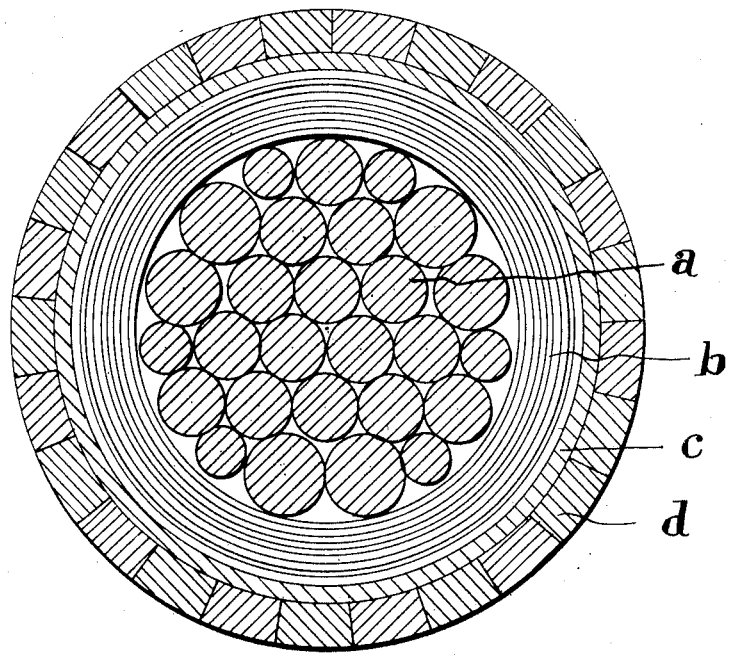
INVENTOR:
M. Budsheid
BY: Marks & Clerk
ATTORNEYS.

Patented Feb. 20, 1934

1,948,439

UNITED STATES PATENT OFFICE 1,948,439

ELECTRIC POWER CABLE

Michael Büdscheid, Cologne-Holweide, Germany, assignor to Felten & Guilleaume Carlswerk Actien-Gesellschaft, Cologne - Mulheim, Germany Application November 1, 1926, Serial No. 145,606, and in Germany April 12, 1926

1 Claim. (Cl. 173—266)

This invention relates to an electric power cable having impregnated paper insulation, lead sheathing and armouring and a copper conductor consisting of several layers of wires of circular cross section of equal pitch and the same direction of laying, the outermost layer of which containing wires of different diameter which are distributed therein in such a manner that the whole of the conductor contains wires lying close together and is almost of circular cross section.

The accompanying drawing illustrates a cross section of the power cable according to the invention.

The power cable consists of a stranded copper conductor $a$, the impregnated paper insulation $b$, the lead sheathing $c$ and the armouring $d$ which is made of flat wires. The copper conductor $a$ comprises three layers of wires of circular cross section which are stranded together with the same pitch and the same direction of laying. The two inner layers of the copper conductor comprise wires of the same cross section and they have a cross section which is approximately triangular. The outer stranding layer of the copper conductor contains, in addition to wires of the same diameter as those of the inner layers, compensating wires having a smaller diameter than the wires of the inner layers, and also wires of larger diameter than the wires of the inner layers. These wires are so arranged in the outer stranding layer that the copper conductor has an approximately circular cross section with the wires close together and an outer surface which is almost closed.

As with an equal cross-sectional area of copper, the external diameter of the close stranded conductor according to the invention is smaller than the diameter of the strands hitherto employed, a substantial economy in cable insulation, in lead for the sheathing and in armouring material is secured. As a result of this economy and shortening of time of manufacture, the introduction of the close stranded conductor in the industry means a substantial reduction in price of these cables.

The close and circular stranded conductor according to the invention is of especially great importance as regards the insulating material with which the power cable is impregnated. The amount of impregnating material mainly consisting of oil must be especially taken into consideration in view of the expansion which takes place when the cable is heated during its operation. According to recent investigations, the electric properties of the cable are improved by using an amount of impregnating material which is as small as possible. This desired reduction in the amount of impregnating material is attained in electric power cables by using the stranded conductor with close cross-section according to the invention, instead of the strands hitherto employed in electric power cables, in which the large gaps left between the individual wires take a large amount of impregnating material.

What I claim is:

Electric power cable having paper impregnated insulation, a lead sheathing, an armouring and a copper conductor comprising a plurality of layers of round wires, the wires of the adjacent layers being laid with the same pitch, the outermost layer of said conductor containing compensating wires having a smaller diameter than the wires of the inner layers, and also comprising wires of larger diameter than the wires of the inner layers so that the conductor has a close, substantially circular cross section.

MICHAEL BÜDSCHEID.